Jan. 10, 1967  G. L. WILDE ETAL  3,297,279
AIRCRAFT

Filed May 5, 1965  2 Sheets-Sheet 1

INVENTORS
GEOFFREY LIGHT WILDE
MAURICE IAN TAYLOR

By Cushman, Darby & Cushman
ATTORNEYS

United States Patent Office 3,297,279
Patented Jan. 10, 1967

3,297,279
AIRCRAFT
Geoffrey Light Wilde and Maurice Ian Taylor, Derby, England, assignors to Rolls-Royce Limited, Derby, England, a company of Great Britain
Filed May 5, 1965, Ser. No. 453,284
Claims priority, application Great Britain, Dec. 11, 1964, 50,649/64
7 Claims. (Cl. 244—54)

This invention concerns aircraft and, although not so restricted, it will hereinafter be described with reference to vertical take-off and landing aircraft.

According to the present invention there is provided an aircraft including an engine housing and a gas turbine engine conventionally mounted by trunnions or the like within the housing. The gas turbine engine having an engine casing which defines with the housing and an annular chamber, the casing being provided with a plurality of circumferentially disposed bleed air apertures through which bleed air can flow from the compressor of the engine into the chamber. Annular seals are disposed within the chamber between the housing and the engine casing and defining therebetween a bleed air manifold which communicates with the apertures. An advantage of the invention is that the engine can be orientated within the aircraft housing, its circumferential position not being critical with respect to the manifold and bleed air apertures. With arrangements in which the bleed air manifold is within the engine casing, the common outlet from the manifold must be placed in a predetermined position and thus there is only one position in which the engine can be fixed. This can cause difficulties due to interference with the remaining structure and assemblies of the aircraft.

Preferably said housing is provided with an annular channel at the axial location of the bleed air apertures of said engine, the channel providing at least part of said manifold. By providing the aircraft housing with a channel to form the manifold the housing itself may be made even smaller, the engine being a snug fit therewithin.

Preferably the seals are inflatable tubes, means being provided for inflating the tubes after insertion of the engine into the housing to seal the engine therein and means for inflating the tubes after insertion of the engine into the housing, the tubes, when so inflated, providing some lateral support to the engine.

Means may be provided for deflating and inflating said tubes after mounting the engine in said housing whereby dump valves are provided through which air bled from the compressor may flow to atmosphere.

Preferably there is a common outlet in said manifold for the feed of air thereto and a cascade of vanes disposed within said manifold adjacent each aperture, the vanes adjacent the apertures farthest from said common outlet providing less impedance to air flow through said apertures than the vanes adjacent the apertures closest to said common outlet. Alternatively the housing may be provided with a perforated sleeve, the openings in which conduct air leaving said apertures into said manifold, the openings farthest from said common outlet being larger than the openings closest to said common outlet.

In a preferred embodiment the housing forms part of the aircraft structure and is made of a material having a honeycombed structure. With this arrangement the stressed skin construction which is common in modern aircraft assembly is not unduly affected by the apertures which need to be cut in the structure to form the engine housings since the housings themselves, forming part of the aircraft structure, reinforce the apertured construction.

Preferably the aircraft is adapted for vertical take off and landing, said housing and engine being substantially vertically disposed to provide direct vertical thrust i.e. thrust which is not produced aerodynamically. The aircraft may be provided with a plurality of housings and engines.

The invention is illustrated merely by way of example in the accompanying drawings, in which.

Figure 1:
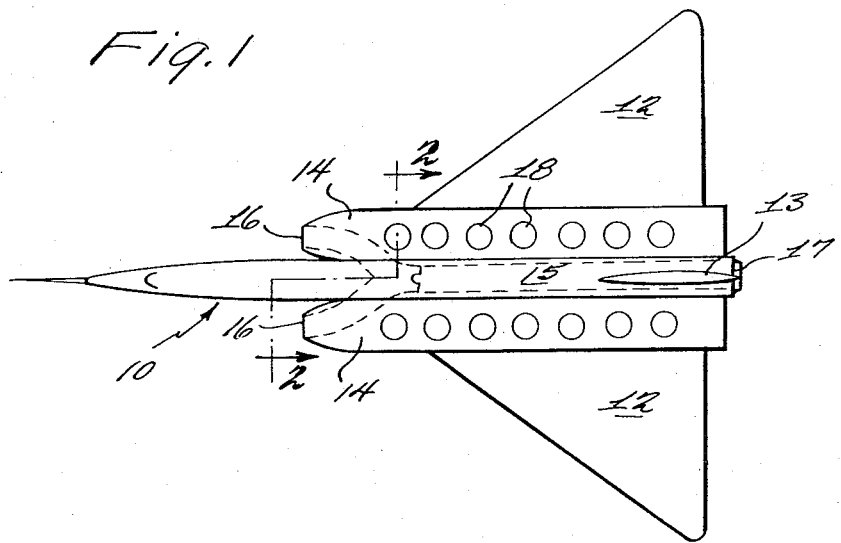
FIGURE 1 is a plan view of an aircraft according to the present invention.

Referring to the drawings there is shown an aircraft 10 comprising a fuselage 11, wings 12, tail plane 13 and two elongated longitudinally extending housings 14 disposed one on either side of the fuselage 11. A just propulsion engine 15 disposed within the fuselage 11 is fed with air through air intakes 16 at the forward end of each of the housings 14. Exhaust gases from the engine 15 flow to atmosphere through an exhaust nozzle 17. Housed within each of the housings 14 are seven vertically disposed "lift" engines 18 each of which is adapted to provide direct vertical lift for the aircraft to enable it to take-off and land vertically.

Each engine 18 has a compressor, combustion equipment and turbine, the exhaust gases being directed substantially vertically downwardly to provide vertical thrust. Each engine is provided with an engine casing 20 and is sealed within an aircraft housing 21 of "honeycomb" structure. The engines 18 are supported in the housing 21 by conventional means, for example, trunnions 45 diagrammatically illustrated in FIGURE 2. Each engine casing 20 is provided with a plurality of bleed air apertures 22 through which air bled from the compressor of the engine may flow. The housing 21 is provided adjacent the circumferentially disposed apertures 22 and at the axial location thereof with an annular channel 23 defining part of an annular manifold 24.

Attached to the engine casing 20 at axially spaced positions on each side of apertures 22 are annular abutments 25 against which inflatable annular tubes 26 may abut to seal the annular space between engine casing 20 and the annular groove 23. This sealed annular space forms the annular manifold 24 for the bleed air issuing from apertures 22. The air accumulating in the manifold 24 flows via a common outlet duct 27 to positions of use on the aircraft e.g. stabilising jets, air motors and pneumatic equipment.

Figure 3:
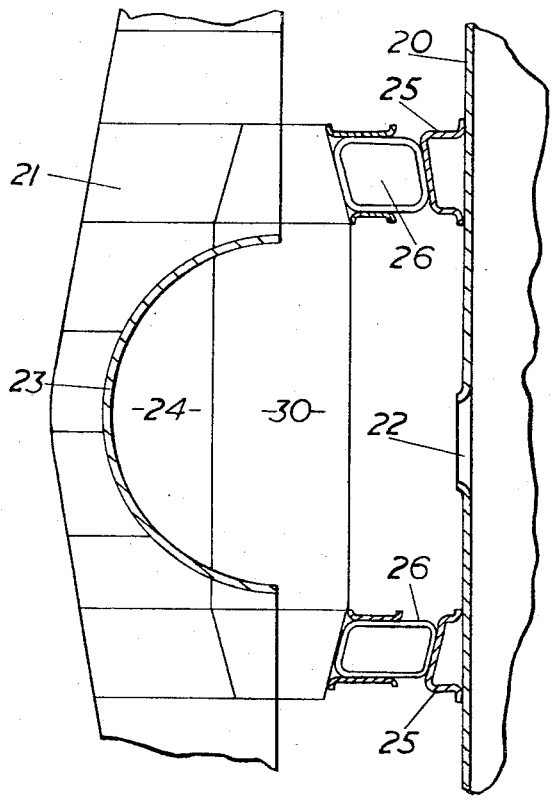
FIGURE 3 is a part sectional elevation of part of the aircraft shown in FIGURE 2, but to a larger scale.

Disposed adjacent each aperture 22 within the annular manifold 24 is a cascade of vanes of which only one vane, 30, is shown in FIGURE 3. The angular positions of the cascade of vanes 30 adjacent the various apertures dictate the amount of air which may be bled through the respective apertures. It is arranged, prior to inserting the engine 18 in its respective housing 21, that the vanes 30 adjacent the apertures 22 which are farthest from the common outlet 27 have a relatively small angle of incidence relative to the air issuing from apertures 22, whereby there is relatively little impedance to the flow of air into the manifold. The vanes 30 adjacent the apertures 22 which are closest to the common outlet 27 have a relatively high angle of incidence to restrict air flow through these apertures. By arranging the cascade of vanes 30 in this manner the rate of air flow through the apertures 22 may be rendered constant around the whole of the periphery of the engine 18 thus ensuring that excess bleed air is not drawn from any particular portion of the engine, e.g., adjacent outlet tube 27. Thus no "hot spots" occur in the engine.

The use of the inflatable tubes 26 to seal the engines 18 within the housings 21 is most useful in that insertion and removal of the engines 18 is rendered relatively easy. The engines are inserted before inflation of the tubes 26 which, when inflated, provide a very effective seal against the engine casing 20.

The aircraft is provided with a device (not shown) to deflate and reinflate the tubes 26 once the engine is installed and the tubes 26 can thus be used as "dump" valves through which air bled from the compressor of the engine may be directed to atmosphere. This may be of particular use in off-loading the compressor during acceleration of the engine.

Figure 4:
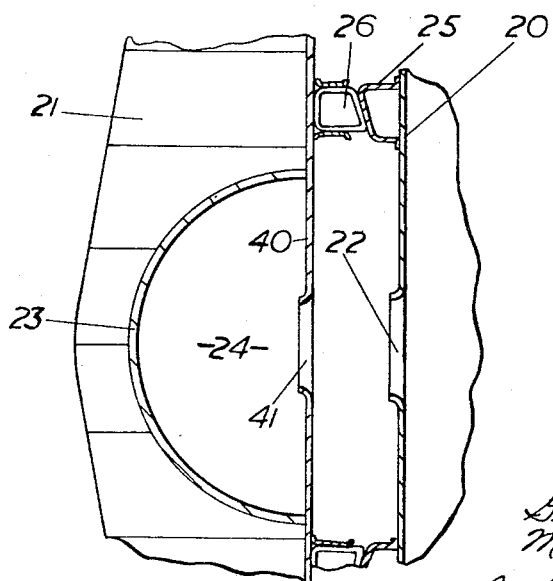
FIGURE 4 is a view similar to FIGURE 3 showing an alternative embodiment.

Referring to FIGURE 4, there is shown an alternative arrangement for controlling the amount of air bled from the apertures 22 into the common manifold 24. Components common to both FIGURES 3 and 4 are marked with common reference numerals. In the FIGURE 4 arrangement however, the cascade of vanes are omitted and in their place an apertured sleeve 40 is provided. Sleeve 40 is provided with openings 41 each of which is disposed adjacent a corresponding aperture 22. The openings 41 provide the only communication between apertures 22 and the portion of the manifold 24 defined by channel 23 and thus air flowing from apertures 22 must flow through the corresponding openings 41 to reach the common air manifold and the outlet 27. The sizes of openings 41 are chosen such that the largest are disposed at the circumferential position farthest from outlet 27 and the smallest are disposed adjacent the outlet 27. In this manner, the amount of air bled through apertures 22 is controlled in a manner similar to that provided by the cascade of vanes 30 of the FIGURE 3 embodiment and thus the rate of air bleed from the engine is substantially constant around its whole periphery.

Figure 2:
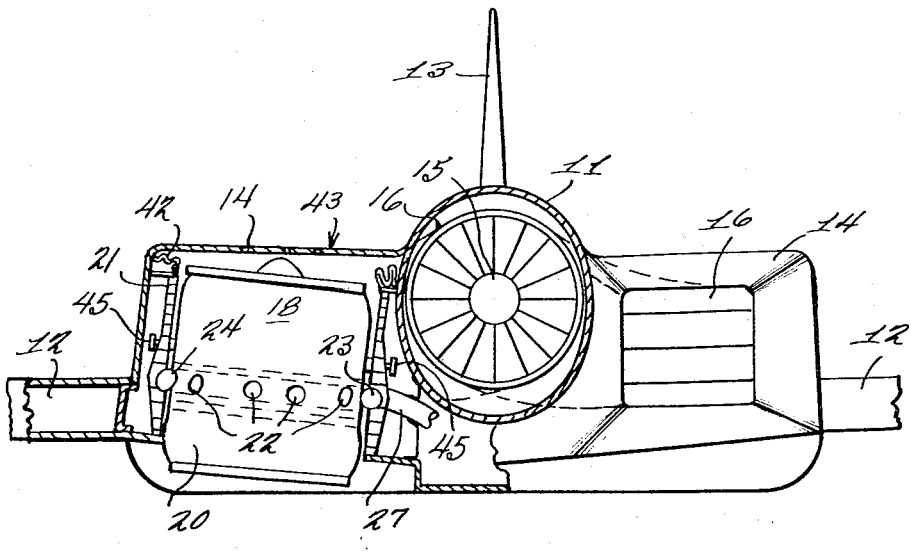
FIGURE 2 is a part sectional end elevation on the line 2—2 of FIGURE 1.

The "honeycombed" housings 21 form an integral part of the aircraft structure and thus reinforce the structure at points which would otherwise be weakened by the need to provide the housings themselves. As seen in FIGURE 2 inflatable rings 42 are provided around the intakes to the engines and are shown in their deflated state. When inflated, they provide smooth intakes to the engines 18. Pivotable doors 43 are provided over each of the engines 18 and these are opened by pivotal movement when the lift engines 18 are to be used.

By forming the bleed air manifold between the engine and housing within which the engine is disposed, the engine is effectively integrated with the aircraft engine housing. Also, the overall diameter of the engine is reduced and thus the size of the housing formed in the aircraft is also reduced. A stronger structure is therefore provided which is to be preferred. Also, since the manifold is outside the engine, the position of the outlet 27 is not fixed but can be positioned in the aircraft structure in the most convenient position.

It will be appreciated that, although the invention has been described with reference to its use in lift engines for a V.T.O.L. aircraft it is equally applicable to a horizontally mounted forward propulsion engine in which air must be bled from the engine.

We claim:
1. An aircraft including an engine housing, a gas turbine engine having a casing mounted within said housing, said casing and said housing defining an annular chamber therebetween, said casing being provided with a plurality of circumferentially disposed bleed air apertures through which bleed air may flow from the compressor of the engine into said chamber, and annular seals disposed within said chamber between the housing and said engine casing and defining therebetween a bleed air manifold which communicates with said apertures.

2. An aircraft as claimed in claim 1 wherein said seals comprise inflatable tubes in said chamber to seal the engine to said housing, and means for inflating the tubes after insertion of the engine into the housing, the tubes, when so inflated, providing some lateral support to the engine.

3. An aircraft as claimed in claim 1 wherein there is a common outlet in said manifold for the air fed thereto and a cascade of vanes disposed within said manifold adjacent each aperture, the vanes adjacent the apertures farthest from said common outlet providing less impedance to air flow through said apertures than the vanes adjacent the apertures closest to said common outlet whereby the vanes regulate the amount of air bled through each of the apertures around the engine casing and thus ensure that air bleed around the engine is substantially uniform.

4. An aircraft as claimed in claim 1 wherein there is a common outlet in said mainfold for the air fed thereto and a perforated sleeve on said housing, the openings in which conduct air leaving said apertures into said manifold, the openings farthest from said common outlet being larger than the openings closest to said common outlet, whereby the sleeve regulates the amount of air bled through each of the apertures around the engine casing and ensures that air bleed around the engine is substantially uniform.

5. An aircraft as claimed in claim 1 wherein the engine housing forms part of the air frame of the aircraft, said housing being made of a material having a honeycombed structure.

6. An aircraft as claimed in claim 1 wherein an annular channel is provided in said housing at the axial location of the bleed air apertures of the casing.

7. An aircraft as claimed in claim 2 wherein means are provided for deflating and inflating said tubes after mounting the engine in said housing to thereby provide dump valves through which air bled from the compressor may flow to atmosphere.

References Cited by the Examiner
UNITED STATES PATENTS

| | | | |
|---|---|---|---|
| 3,031,128 | 4/1962 | Rubbra | 230—114 X |
| 3,031,132 | 4/1962 | Davies | 230—114 X |
| 3,057,541 | 10/1962 | Hasbrouck et al. | 230—114 |
| 3,127,129 | 3/1964 | Petrie | 244—42 |
| 3,154,241 | 10/1964 | Kent et al. | 230—114 |
| 3,228,702 | 1/1966 | Ulm et al. | 277—34 |

FOREIGN PATENTS 646,370   8/1962   Canada.

MILTON BUCHLER, Primary Examiner.

B. BELKIN, Assistant Examiner.